United States Patent
Christensen

[15] 3,676,320
[45] July 11, 1972

[54] METHOD FOR DEPOSITING THIN FILMS ON THIN ELONGATED ELECTRICALLY INSULATING SUBSTRATES

[72] Inventor: Orla Christensen, Copenhagen, Denmark
[73] Assignee: Disa Elektronik A/S (Dansk Industri Syndikat A/S), Herlev, Denmark
[22] Filed: March 13, 1970
[21] Appl. No.: 19,352

[30] Foreign Application Priority Data
March 17, 1969 Denmark.....................................1443

[52] U.S. Cl.............................................204/192, 204/298
[51] Int. Cl.........................................................C23c 15/00
[58] Field of Search..........................204/192, 298; 73/362 R

[56] References Cited

UNITED STATES PATENTS

| | | |
|---|---|---|
| 2,451,877 | 10/1948 | Samuelson.............................204/192 |
| 3,333,470 | 8/1967 | Fingerson..............................73/362 R |
| 3,461,054 | 8/1969 | Vratny...................................204/192 |
| 3,616,404 | 10/1971 | Gregory.................................204/192 |

Primary Examiner—G. L. Kaplan
Assistant Examiner—Sidney S. Kanter
Attorney—Beveridge & De Grandi

[57] ABSTRACT

A method for depositing thin films on thin elongated, electrically insulating substrates by bias-sputtering material from two targets on to the substrates in an electrical plasma, the substrates being suspended over apertures in an electrically biased metallic substrate holder, around which is formed a dark space filling said apertures and surrounding the substrates. A thin film deposited by said method has good film adhesion, good all-over uniformity and electrical properties close to the bulk valus of the film material so as to be applicable as sensing element in sensors.

1 Claim, 6 Drawing Figures

INVENTOR:

ORLA CHRISTENSEN

BY Beveridge + De Grandi,
ATTORNEYS

METHOD FOR DEPOSITING THIN FILMS ON THIN ELONGATED ELECTRICALLY INSULATING SUBSTRATES

BACKGROUND OF THE INVENTION.

This invention relates to a method for depositing thin films by bias-sputtering on thin elongated substrates, of which at least part of the surface is electrically insulating. In the following specification substrates of this kind will generally be designated fiber substrates or fibers.

The operation of sensors used in the control and measuring technique is often based upon the temperature dependence of the resistance of the sensing element. Sensors of this kind usually have a very thin metal wire with a diameter of e.g. 1 – 10 $\mu$ as a sensing element. As a consequence of this small thickness these sensors are extremely vulnerable from a mechanical point of view, so that the usefullness of such wire sensors is, to a large extent, restricted hereby.

A structure, which is mechanically stronger, can be obtained by employing a sensing element having the form of an electrically insulating fiber coated with sensing material in thin film form since such fibers may be chosen considerably thicker than corresponding metal wires, e.g. with a diameter of 25 – 200 $\mu$.

Sensing elements in the form of thin film-coated fibers have, moreover, the advantage of offering substantially greater possibilities with regard to the choice of sensing material and, thus, the possibility of choosing a material having the desired electrical and thermal properties. In order to obtain a high sensitivity of resistance-temperature depending thin film sensors it is to be observed that the thin film should have a numerically high resistance-temperature coefficient. In the case of metal sensors the temperature coefficient should be as close as possible to the so-called bulk value, which implies exacting requirements to be satisfied with respect to the uniformity and purity of the deposited material.

Good properties in respect of uniformity and purity of thin film coatings can be obtained by means of evaporation taking special precautions, such as the use of high vacuum with a low content of residual gases. In evaporation of thin films on thin fiber substrates it will, however, be necessary to allow the fiber to rotate during the deposition in order to obtain a uniform coating along the circumference of the fiber. Despite the special precautions, the thin film will hereby be contaminated by the residual gases in the vacuum chamber, so that the resulting thin film will possess more inferior electrical and thermal properties than a thin film which, in the same circumstances, is deposited on a flat, non-rotating substrate. The evaporation technique has, moreover, the disadvantage that the film adhesion is generally not very good. In addition rather narrow limits exist with regard to the choice of thin film materials which are suitable for depositing by means of this method.

Excellent thin film properties can be obtained with the aid of so-called bias sputtering. In sputtering material is transferred to the substrate from a target with thin film material by means of ion bombardment in an electrical discharge. By applying bias to the substrate, a negative electric potential relative to the plasma of the discharge is obtained at the surface of the substrate, whereby a so-called dark space is formed around the substrate. Gas ions from the plasma are accelerated through this dark space for dislodging material from the thin film during its formation. Material is, thus, transferred both from the target in the direction towards the substrate and in the direction away from the substrate, the resulting transfer of material being, however, in the direction towards the substrate. Hereby a successive cleaning of the thin film during its formation is obtained, and the final thin film achieves high degree of purity and good electrical and thermal properties.

A method, in which said technique is utilized for depositing thin film on to insulating substrates, is described in U.S. patent application Ser. No. 883,801 filed by the applicant. In said application it is mentioned that particular problems arise by establishing the required bias on insulating substrates. If a negative D.C. bias voltage is used, it has to be applied to the substrate via conductive islands on same, resulting in non-uniform bias distribution throughout the substrate, so that it is difficult to obtain uniform thin film coatings. According to the above-mentioned application, said problem is solved by applying a substrate-bias in the form of a RF voltage. Hereby, a uniformly distributed, negative electrical potential relative to the plasma will be generated at the surface of the substrate.

In sputtering, the target usually has a geometrical shape corresponding to the shape of the substrate, so that in the case of an elongated, for example a cylindrical substrate, a tubular target will be employed which, in a triode sputtering system, surrounds the electrical discharge, and the axis of which coincides with that of the substrate. However, this will only be expedient, if the substrate has reasonable geometrical proportions. If, in addition, film properties corresponding to the bulk properties are desired, problems arise, moreover, with respect to obtaining the necessary bias on the substrate, and these problems will arise irrespectively of the fact whether the bias is a D.C. voltage or a RF voltage. In both instances, it has, as a matter of fact, appeared to be practically impossible to obtain a uniformly distributed negative potential on the surface of thin fibers. By employing a RF voltage for obtaining the said bias, the difficulties are mainly due to the high impedance of the thin insulating fiber and it could, therefore, be presumed that the problem would be solvable by simply increasing the frequency of the RF voltage, but this is impossible in practice on account of difficulties in shielding and grounding of the set-up.

Neither will it be possible to solve said problem by allowing the fiber to rotate during deposition, because the impedance will still prevent the formation of a uniformly distributed potential at the surface of the fiber. Besides, it will be difficult to supply the bias to a rotating substrate.

The object of the present invention is to provide a method for depositing thin films on thin elongated substrates of the kind mentioned, in which the above-mentioned problems are overcome in a simple manner, so that good uniformity and purity of the final thin film is obtained.

In the method according to the invention two plate-shaped targets with thin film material are employed and the substrate is placed on the substrate holder over an aperture in same. Thereby, it is achieved that bias-sputtering is established without applying a bias to the substrate it-self. The bias, which is supplied to the metallic substrate holder, can be a DC voltage or a RF voltage, as desired.

In a sputtering process of the kind dealt with here, in which biasing of the substrate is employed, the magnitude of the bias will normally be a given parameter, which is determined with a view to, inter alia, the sputtering conditions for the targets. In specific operating conditions, the size of the said aperture in the substrate holder is chosen in such a manner that the dark space resulting from the bias applied to the substrate holder fills up the aperture and surrounds the substrate placed thereover.

The invention also relates to sensors having a metallic sensing element which, in the form of a thin film, is arranged on a thin elongated, electrically insulating support by means of the method according to the invention. In such a sensor the sensing element has a resistance-temperature coefficient lying close to the bulk value of the thin film material.

BRIEF DESCRIPTION OF THE DRAWINGS

In the following, the invention is by way of example explained in greater detail with reference to the diagrammatical drawings, in which.

DETAILED DESCRIPTION

Figures 1, 2:
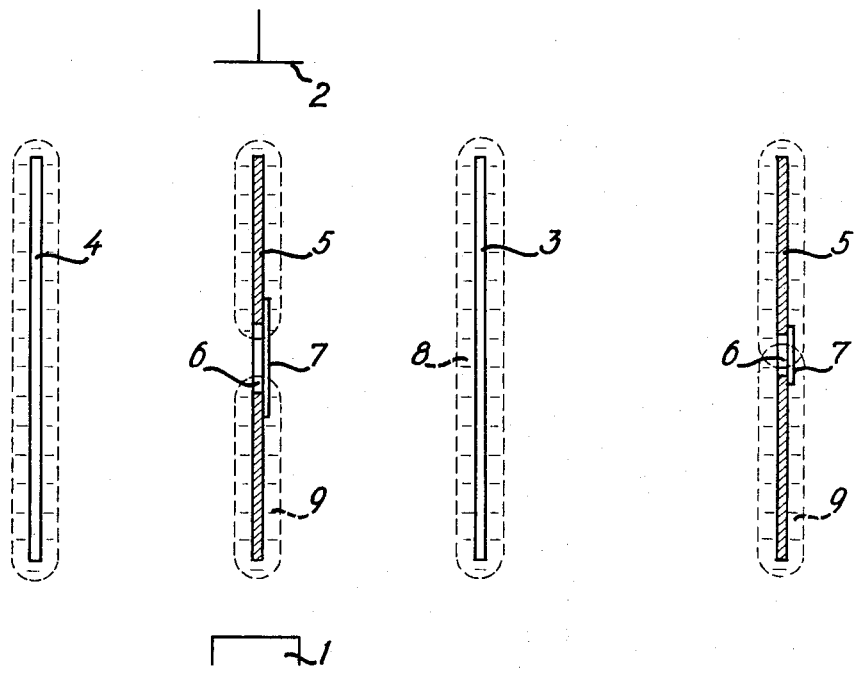
FIGS. 1 and 2 illustrate diagrammatically the method according to the invention for one electrode configuration.

The arrangement, shown in FIG. 1 for carrying out a sputtering process comprises a cathode 1 and an anode 2, between which an electric glow discharge can be produced, as well as two targets 3 and 4, which, by means of sputtering have to supply material to a thin fiber 7, which is placed over an aperture 6 in a plate-shaped metallic substrate holder 5, which is situated halfway between the targets 3 and 4 in such a relation to the cathode 1 and the anode 2, that two symmetrical sputtering spaces are formed between these electrodes. The condition produced in the glow discharge for attracting ions from the plasma to the targets 3 and 4 for dislodging material in the form of atoms or groups of atoms therefrom is, that around the targets 3 and 4 so-called dark spaces 8 are formed, which are shown in dotted lines in the figure, in which dark spaces the electrons of the plasma are repelled while the ions are accelerated towards the targets, so that the surfaces thereof are subjected to an ion bombardment and are, hereby, disintegrated. Such dark spaces will be produced around the targets if the surfaces thereof have a negative electrical potential relative to the plasma. This can be obtained by supplying a bias to the targets either directly in the form of a negative D.C. voltage or by supplying a RF voltage through a capacitor, whereby a negative potential is produced at the surfaces of the targets due to the difference between the mobility of electrons and ions, such as explained in greater detail in the aforementioned U.S. patent application Ser. No. 883,801.

To obtain sputtering from the film under formation it is necessary to establish a dark space surrounding the substrate, corresponding to the ones which are produced around the targets. In the case of flat, insulating substrates, said dark space can, as explained in the above-mentioned application, be produced by applying to the metallic substrate holder a RF bias which will be transferred through the substrate and thereby form a uniform dark space directly around same. If, however, the thin film is to be deposited on a fiber, it appears that a dark space cannot form directly around such a substrate.

In FIG. 1, the filter 7 is placed over a relatively large circular aperture 6 in the substrate holder 5, around which a dark space 9 is formed by supplying a bias in the form of, for instance, a RF voltage. In the substrate holder shown, no dark space is formed around the substrate itself and no sputtering of material takes place from the thin film, which is formed on this substrate and thus, no cleaning of the thin film such as desired.

If, instead, the area of the aperture in the substrate holder, as shown in FIG. 2, is reduced, so that the dark space which is produced around the substrate holder 5, completely fills up the aperture 6, the substrate 7 too, will be surrounded by a dark space, in which ions from the plasma will be attracted and bombard the thin film on the substrate 7 during its formation. It has thus been found that it is possible to achieve sputtering of the thin film deposited on the substrate without supplying a bias directly to the substrate, since the dark space around the substrate is formed as a consequence of the bias supplied to the substrate holder. This latter bias need not be a RF voltage, but may just as well be a negative D.C. voltage which is directly supplied to the substrate holder. The substrate has, of course, to be placed over the aperture in the substrate holder in such a way that the portion of it, on which a coating of thin film material is desired, is completely surrounded by the dark spaces established around the substrate holder. The substrate is therefore preferably arranged with its longitudinal axis extending parallel to the surface of the substrate holder.

By this method, good uniformity and high purity of the thin film is obtained, although the substrate does not rotate during the deposition of the thin film and despite the fact that sputtering takes place from two flat targets. This can presumably be explained by the fact that sputtering does not only take place directly from the targets but also from the substrate holder against the sides of the substrate which are not directly facing the targets, since the substrate holder, during the process, is successively supplied with thin film material from the targets and delivers said material again to the substrate. It will consequently be necessary that the substrate holder prior to the provision of the substrate, is coated with thin film material, e.g. by means of bias-sputtering from the targets.

It appears clearly that the pre-condition for permitting the dark space resulting from the bias applied to the substrate holder to fill up the aperture over which the substrate is placed, will be that the shortest proportion of this aperture at the most is equal to twice the thickness of said dark space. In practice, in order to obtain a good result, it will have to be preferred that this proportion is somewhat smaller.

Figure 3:
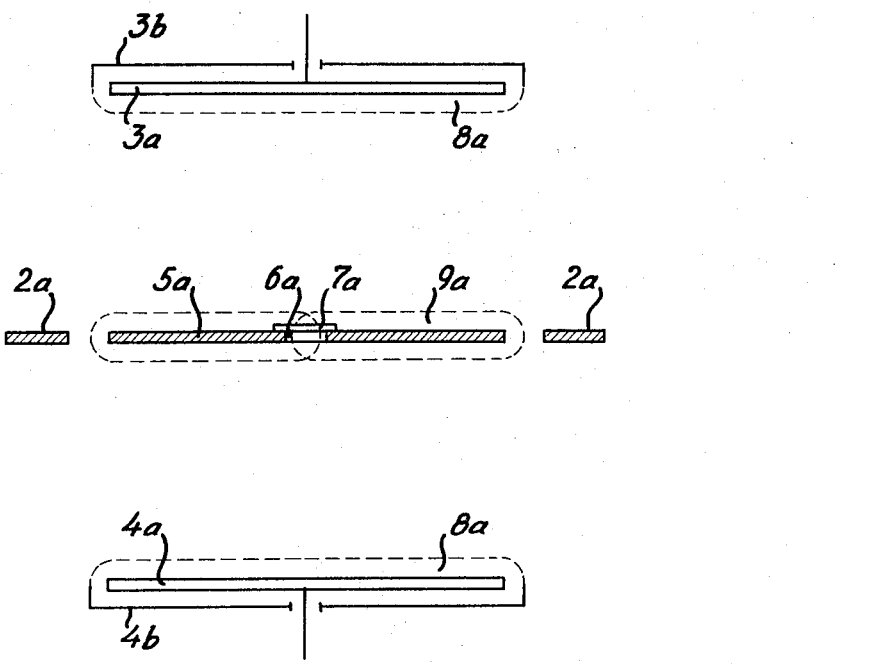
FIG. 3 shows a diagrammatical view of another electrode configuration.

The electrode configuration shown in FIG. 1 comprises an anode, a cathode, two plane targets and a plane substrate holder and is a double-triode. The use of the method according to the invention is, however, not restricted to this particular electrode configuration. As shown in FIG. 3 the method according to the invention may, for example, also be carried out by means of an electrode configuration, in which the targets themselves constitute electrodes active in establishing the electrical plasma. The configuration shown in FIG. 3 is a double-diode system comprising two plane targets 3a and 4a, which are simultaneously acting as cathodes and are located on each side of the plane substrate holder 5a, which corresponds to the substrate holder 5 shown in FIG. 2, and which is surrounded by a common annular anode 2a. In this system each of the two plasma halves is established between one target and the corresponding part of the common anode 2a. The formation of dark spaces 8a and 9a around the targets 3a and 4a and the substrate holder 5, respectively takes in principle place in the same way as described with reference to FIGS. 1 and 2. However, in the diode system shown in FIG. 3 the two targets are according to normal practice shielded as shown at 3b and 4b respectively in order to avoid sputtering from the rear side of the targets.

Figures 4, 5:
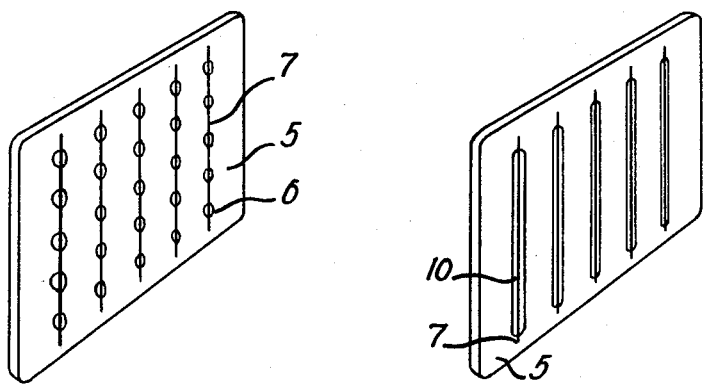
FIGS. 4 and 5 show two embodiments of substrate holders for accomodating substrates that are to be coated.

In the examples described above, the aperture in the substrate holder is circular, so that also the portion of the substrate which is to be coated will be smaller than or equal to twice the thickness of the said dark space. This design of the aperture can, in practice, be employed, if relatively short thin film-coated sensing elements of the kind stated in the preamble, are to be produced. The substrate holder 5 can, in that case, as shown in FIG. 4, be provided with a plurality of such apertures arranged in rows and a fiber having a suitable length for this purpose, can be placed over all the apertures in a row, which fiber, subsequent to the thin film deposition can be cut into a number of sensing elements corresponding to the number of apertures in the row. The distance between such apertures has to be reasonably big, e.g. twice as big as the thickness of the dark space.

In FIG. 5, another embodiment of the substrate holder is shown in which said holder, instead of circular apertures, comprises a number of oblong slits 10 having an appropriate width in relation to the thickness of the dark space, i.e. less than the double of said thickness. With this form of the apertures, it is possible to coat a greater length of a fiber 7 with thin film material by arranging the fiber with its longitudinal axis in the longitudinal direction of the slit 10.

Figure 6:
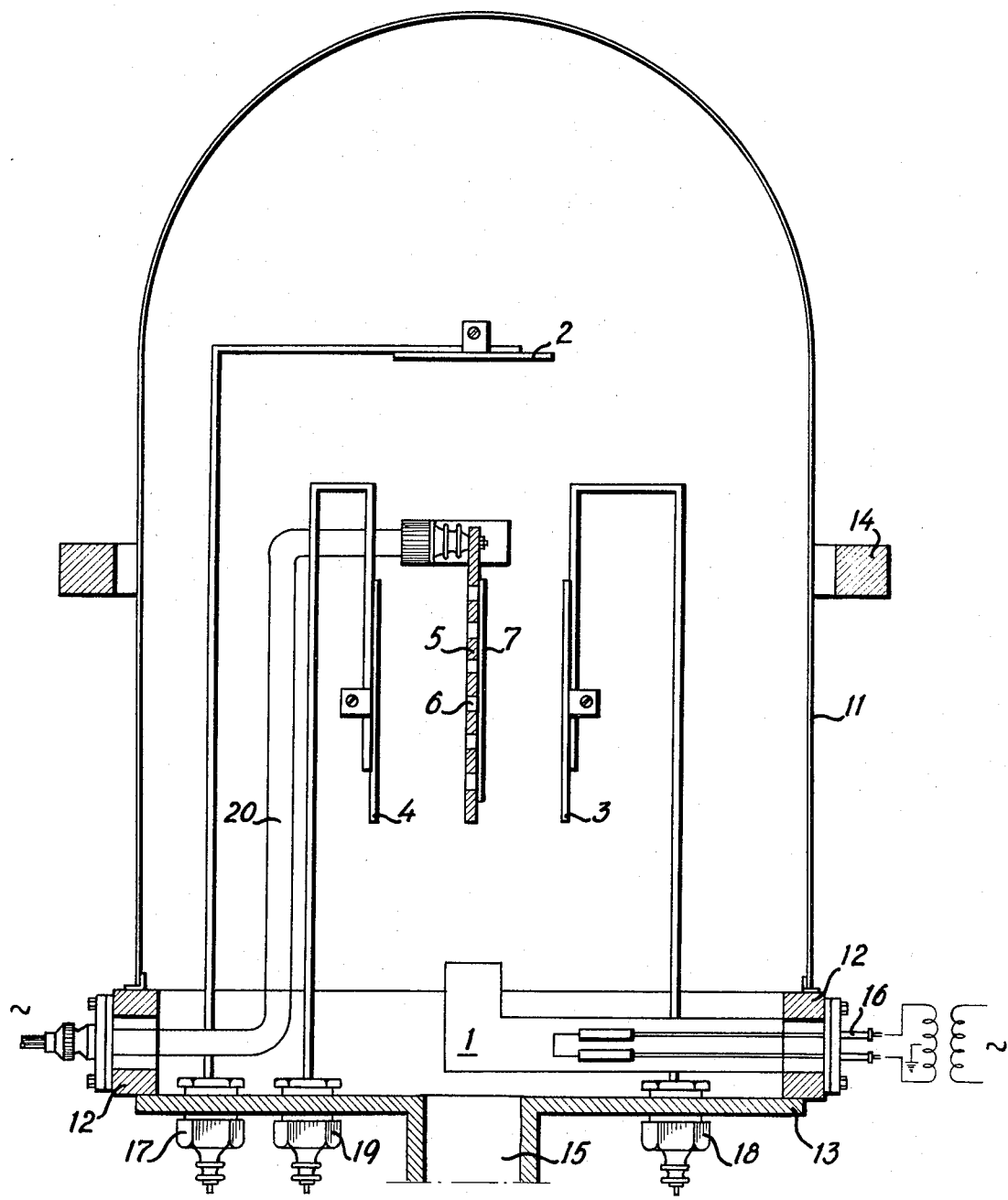
FIG. 6 shows an embodiment of an apparatus for carrying out the method according to the invention.

The apparatus for carrying out the method according to the invention, shown in FIG. 6, comprises an electrode configuration as shown in FIGS. 1 and 2 with the cathode 1, the anode 2, the two identical targets 3 and 4, consisting of the material to be deposited on at least one substrate, and the substrate holder 5 located halfway between the targets, which holder is of the type shown in FIG. 4 and serves as a support for a plurality of fibers 7, of which the portions that are to be coated with thin films are placed over the apertures 6 in the substrate holder. It is not shown in the figure, how the substrates 7 are fastened to the substrate holder 5, but this may be done by means of clips.

This configuration is located in a vacuum chamber 11 mounted on a feed-through ring 12 which rests on a baseplate 13. An electromagnet 14 formed as a coil is arranged around the vacuum chamber 11. The required vacuum is produced through an opening 15 in the baseplate 13 by means of a mechanical pump and an oil diffusion pump, which are not shown in the figure. The required voltages to the cathode 1 and the anode 2 are supplied from a D.C. voltage supply, not shown, by means of lead-ins 16 and 17 in the feed-through ring 12 and the baseplate 13, respectively. The targets 3 and 4 are, in the example shown, supplied with a D.C. voltage negative in relation to the electric plasma by means of lead-ins 18 and 19, respectively, in the baseplate 13.

The metallic plate-shaped substrate holder 5, which, e.g. may be of copper and, as already mentioned, may have a coating of thin film material, is, in the example shown, supplied with a bias in the form of a RF voltage which, by means of a coaxial conductor 20 mounted in the feed-through ring 12, is supplied from a RF generator, not shown, with an associated impedance matching network. The frequency of said voltage lies in the lower end of the MHz range and is, for instance, 13.56 MHz.

All leads to anode, targets and substrate holder are, in a manner not shown, shielded with pyrex glass in order to avoid undesirable sputtering effects, which would contaminate the thin film formed on the substrates.

When the vacuum chamber 11 has been pumped out to the desired initial pressure, sputtering gas is supplied via a needle valve, not shown, pumping of the chamber being continued through a valve, not shown, between the chamber and the oil diffusion pump.

The cathode 1, which may be a directly heated tungsten cathode, can, for example, be supplied with an A.C. current of 45 amperes having a frequency of 50 Hz from a center point-grounded transformer. Hereby, by means of thermal emission, a sufficiently large number of electrons will be emitted for establishing a stable glow discharge at a gas pressure of 1 mTorr and a voltage drop of 40 volts between the anode 2 and the cathode 1, the discharge current being 4 amperes. In the apparatus shown, the glow discharge, as a consequence of the location of the substrate holder, will comprise two plasma halves, and it has been shown that the division of the discharge, which is obtained solely with the aid of the substrate holder, is sufficient during operation, to achieve symmetry between the two plasma halves, so that additional means for this purpose are unnecessary.

By a spacing between the substrate holder 5 and each of the two targets of 50–60 mm, substrate holder and target areas of approximately 140 cm$^2$ and a magnetic field from the coil 14 of approximately 600 ampere-turns, the substrate holder 5 is supplied with e.g. an RF voltage of 200 volts peak-to-peak and a D.C. voltage of −650 volts relative to the plasma is supplied to both targets. By the application of the RF voltage it appears that minor differences between the aforementioned two plasma halves are equalized.

Hereafter, the actual sputtering process proceeds in essentially the same way as has been described in the aforementioned U.S. patent application Ser. No. 883,801.

The uniformity of a thin film, deposited on a substrate of the kind stated by means of the method according to the invention can, due to the geometrical shape of the substrate not be examined by means of the usual methods for examining the properties of thin films.

An evaluation of the uniformity can, however, be obtained by measuring the resistance-temperature characteristic of a sensing element in the form of a thin film-coated insulating fiber. With measurements taken in practice of sensing elements manufactured by means of the method according to the invention, it has been found that resistance variations between individual elements are small and that the resistance-temperature characteristics show a pronounced linear course with a large slope.

By means of the method according to the invention and by using the apparatus shown in FIG. 6, sensing elements in the form of thin glass fibers having a diameter of approximately 70 $\mu$ and coated with a thin film made of nickel having a thickness of approximately 0.1 $\mu$ have been manufactured by fastening five fibers to a substrate holder containing 25 circular apertures arranged in five rows in such a way, that on each fiber five thin film-coated sensing elements are produced. For the sensing elements thus produced, a resistance per unit of length of 3.6 ohms per mm and a resistance-temperature coefficient of 0.52 per cent per degree Centigrade are measured, and for a complete batch, standard deviations of 0.6 ohm per mm and 0.02 per cent per degree Centigrade are found for the resistance and the temperature coefficient, respectively. For the purpose of comparison with these values, it may be observed that sensing elements presently available in the form of metal wires manufactured entirely of tungsten offer a resistance per unit of length of 2.9 ohms per mm and a temperature coefficient of 0.35 per cent per degree Centigrade. If the slope of the temperature characteristic is utilized as being expressive of the sensitivity, then a sensing element in the form of an insulating support which, by means of the method according to the invention is coated with a metallic thin film, possesses a sensitivity which is more than 80 percent higher than such known metal wire sensing elements. The thin film sensing elements possess, in addition, as mentioned previously, also other advantages over metal wire sensing elements.

What I claim is:

1. A method for depositing a circumferential thin film on a thin elongated substrate of a substantially fiber-shaped configuration, of which at least part of the surface is electrically insulating, said substrate having a diameter up to about 200 microns, said method comprising the steps of:

arranging a plane, metallic, apertured substrate holder comprising the material to be deposited as thin film in a sputtering system substantially midway between two parallel plate-shaped target electrodes comprising the material to be deposited as thin film, suspending the substrate across the apertures in said substrate holder with its longitudinal axis substantially parallel to the surface of the substrate holder, applying a DC voltage or RF voltage to said substrate holder for producing a dark space completely filling up said apertures therein and surrounding the substrate and to sputter said material onto said substrate.

* * * * *